(12) United States Patent
Varner

(10) Patent No.: US 7,669,443 B2
(45) Date of Patent: Mar. 2, 2010

(54) UNIVERSAL MOUNTING AND LOCKING DEVICE FOR TOOL STORAGE CONTAINERS AND PORTABLE ITEMS

(76) Inventor: Kevin Larue Varner, 979 Fulton #493, Sacramento, CA (US) 95825

( * ) Notice: Subject to any disclaimer, the term of this patent is extended or adjusted under 35 U.S.C. 154(b) by 0 days.

(21) Appl. No.: 11/521,786

(22) Filed: Sep. 15, 2006

(65) Prior Publication Data

US 2007/0062228 A1    Mar. 22, 2007

Related U.S. Application Data

(60) Provisional application No. 60/718,237, filed on Sep. 19, 2005.

(51) Int. Cl.
  *E05B 73/00*    (2006.01)
(52) U.S. Cl. ............... 70/58; 70/172; 70/232; 70/DIG. 57; 109/51; 109/52; 224/547; 248/221.12; 248/222.41; 248/224.8; 248/553
(58) Field of Classification Search ............... 70/58, 70/14, DIG. 57, 232, 158, 163–173; 109/50–52; 248/551–553, 224.8, 222.41, 225.21, 221.11, 248/221.12; 224/543, 547; 211/70.6
See application file for complete search history.

(56) References Cited

U.S. PATENT DOCUMENTS

| | | | | | |
|---|---|---|---|---|---|
| 3,398,244 | A | * | 8/1968 | Ertl et al. ..................... 379/437 |
| 3,473,773 | A | * | 10/1969 | Meyer ..................... 248/222.41 |
| 3,564,879 | A | * | 2/1971 | Bennett ....................... 70/232 |
| 3,595,041 | A | * | 7/1971 | Leeper ........................ 70/232 |
| 3,672,190 | A | * | 6/1972 | Palazzolo ..................... 70/58 |
| 3,815,389 | A | * | 6/1974 | Richards, Sr. ................. 70/78 |
| 3,850,392 | A | * | 11/1974 | Gassaway .................... 248/553 |
| 4,249,684 | A | * | 2/1981 | Miller et al. ................ 224/42.4 |
| 4,266,703 | A | * | 5/1981 | Litz ........................... 224/443 |
| 4,325,531 | A | * | 4/1982 | Omholt ...................... 248/553 |
| 4,577,563 | A | * | 3/1986 | Sidler .......................... 109/52 |
| 4,584,856 | A | * | 4/1986 | Petersdorff et al. ............ 70/57 |
| 4,603,829 | A | * | 8/1986 | Koike et al. ................. 248/553 |
| 4,613,109 | A | * | 9/1986 | Boscacci .................... 248/553 |
| 4,658,607 | A | * | 4/1987 | Muse et al. ................... 70/164 |
| 4,805,859 | A | * | 2/1989 | Hudson ...................... 248/148 |
| 5,013,000 | A | * | 5/1991 | Gassaway .................... 248/551 |
| 5,022,534 | A | * | 6/1991 | Briggs ........................... 211/4 |
| 5,228,658 | A | * | 7/1993 | Kelley ........................ 248/551 |
| 5,420,762 | A | * | 5/1995 | Lewis ......................... 362/549 |
| 5,588,631 | A | * | 12/1996 | Yee ............................ 248/553 |
| 5,709,367 | A | * | 1/1998 | Heintz et al. ................ 248/551 |
| 5,778,804 | A | * | 7/1998 | Read ...................... 248/221.12 |
| 5,870,910 | A | * | 2/1999 | Specht ......................... 70/58 |
| 6,151,933 | A | * | 11/2000 | Lentini ....................... 70/159 |
| 2006/0186290 | A1 | * | 8/2006 | Carnevali ............... 248/221.11 |

* cited by examiner

*Primary Examiner*—Lloyd A Gall

(57) ABSTRACT

An apparatus for supporting and locking storage containers and portable items to vehicles, buildings and larger items. A universal two-part mount and lock system whereas one part covers over and conceals second part making it not possible to access fasteners. The two part mount mates together and after actuating a lock makes it so two parts cannot be separated thus protecting an attached portable item from theft.

2 Claims, 4 Drawing Sheets

UNIVERSAL MOUNTING AND LOCKING DEVICE FOR TOOL STORAGE CONTAINERS AND PORTABLE ITEMS

CROSS REFERENCE

Related U.S. application Data Continuation-in-Part of application Ser. No. 60/718,237 Filed on Sep. 19, 2005

BACKGROUND OF INVENTION

The present invention relates to a universal mounting and locking device, particularly mounting and locking portable items to a structure that is less or not portable, and more particularly mounting and locking tool storage containers and portable items to buildings, vehicles and non-portable items.

The vehicles have for many years been a means for the storing and transportation of equipment and tools, while storage containers on vehicles almost always are either permanently mounted or loosely placed. A loosely placed container may use a chain or cable with padlock for theft deterrence. The problem is chains and padlocks are easily defeated by using cheap and easily obtainable bolt cutters or hacksaws. Also, when chained or cabled there may still be undesired movement. A permanently mounted container cannot easily be made portable when needed. My present invention fulfills the needs of mounting and locking storage containers to vehicles. Such containers lacking needed theft protection include U.S. Pat. Nos. 5,524,531, 5,501,355 and 5,224,531.

A device in the past has been invented to fill this need, the patent was issued on Feb. 10, 1982 bearing U.S. Pat. No. 4,249,684. This device is part of an attached container, thus if you need to store items that will not fit into the container then that invention may not be useful. My present invention fulfills the need to be of use with multiple various size containers.

Furthermore, U.S. Pat. No. 4,249,684 claims at least two spaced parallel anchor rails to which said box may be locked. When two parallel rails are used, if when installed they are slightly not parallel, that invention may not perform. My present invention uses only one mount and thus no items to align properly.

Furthermore, the locking action of U.S. Pat. No. 4,249,684 relies on a rod with bottom angled portion interacting with said rails to prevent theft. The parallel rails leave a space under the box where a thief can insert a long pry bar and apply the force needed to straighten this angled portion and steal the container is easily accomplished. My present invention fulfills the need to secure items by using pins with larger heads that interact with a thickness of metal and leave no gaps to insert pry bar.

Furthermore, U.S. Pat. No. 4,249,684 is a box where slots are accommodated beneath the bottom portion of the box. This makes that invention not practical for use on walls. The universal nature of my present invention allows it to be mounted to multiple sides of storage container and locked to a floor, wall or even a ceiling.

SUMMARY OF INVENTION

This need of enabling tool containers to be secure as if permanently attached yet lockable and easily made portable is filled by the present invention. Any storage container that can be bolted or welded to the present invention can be afforded security combined with portability not possible before my present invention.

The present invention consists primarily of two formed, machined and welded parts. One part is a receiving plate that in general will be attached to the vehicle, building, or substantial object by inserting metallic fasteners through provided holes for this purpose. The receiving plate has fastener holes on one surface plane and on a separate surface plane contains slide holes whereas a portion of the slide hole is larger at one end of the hole and smaller at the other end of the hole. These slide holes will accept fasteners or lock pins from lock plate that comprises a formed, box-like structure that fits over and covers the receiving plate. It contains holes which fasteners may pass through to attach to a tool container or portable item. The fasteners attached to the lock plate have larger head than body and protrude from the lock plate so that when the lock plate is placed over the receiving plate the lock pin head passes through the large side of the hole. The lock plate and attached item is then shifted laterally until it cannot be shifted further. A key-locking device is then actuated which makes a reverse lateral movement, and thus a separation of the lock plate and receiving plate is not possible. Thus the item is now as secure as if permanently fastened but- can be made quickly and easily portable by reversing the above stated actions.

There are other parts of the present invention that will be revealed hereinafter.

The parts and their relationship are exemplified in the following disclosure. The scope of the parts and relationship will be revealed in the appended claims.

A BRIEF DESCRIPTION OF DRAWINGS

DETAILED DESCRIPTION OF THE INVENTION

The present invention involves a universal locking and mounting device that allows secure mounting and locking of tool storage containers and portable items to vehicles, buildings and substantial objects. A key lock 36 is actuated once container or item is mounted and there is no access to any fasteners to tamper with for theft purpose. Once mounting is performed and said invention is locked, all exposed surfaces consist of coated metal and a small key lock head 36. The invention allows portable items to be secure from movement and theft in a manner never before revealed in prior art.

Figure 3:
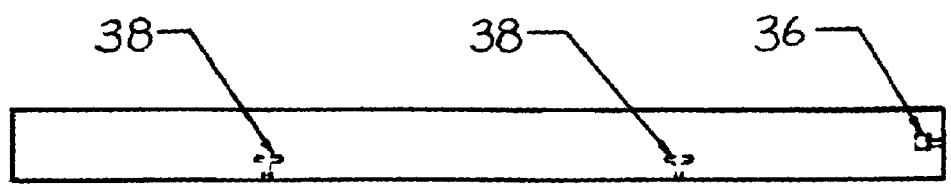
FIG. 3 is a top view of lock plate.
Figure 4:
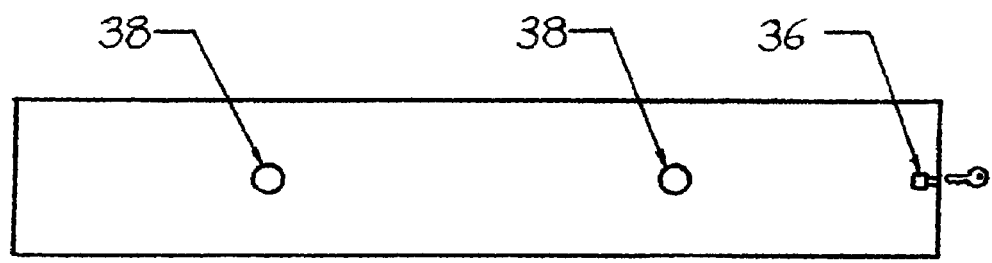
FIG. 4 is a front view of lock plate of a two pin model.
Figure 5:
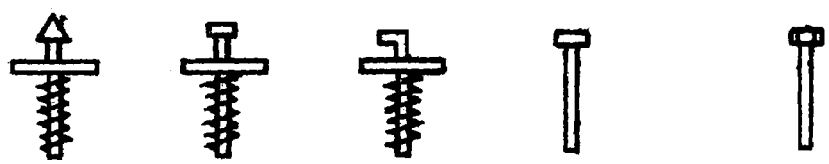
FIG. 5 is a side view of lock pins of different styles.
Figure 6:
FIG. 6 is a top view of lock pins of different styles.
Figure 7:
FIG. 7 is a front or back view of receiving hole of different styles.
Figure 8:
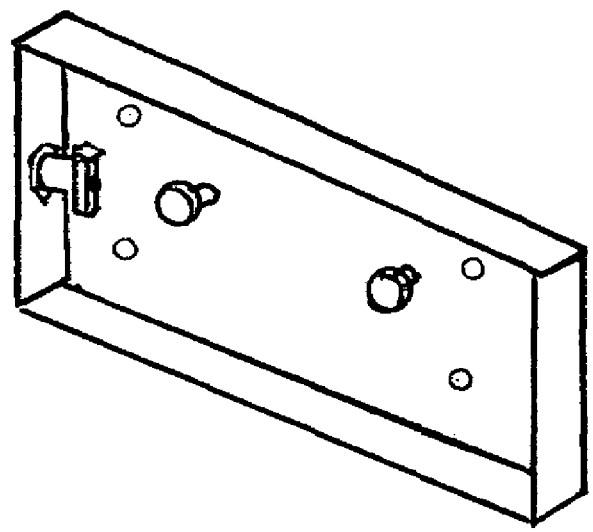
FIG. 8 is a perspective drawing showing receiving plate and lock plate.
Figure 8:
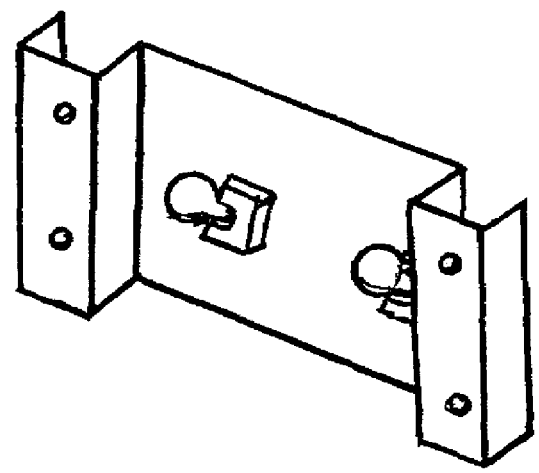

The invention consists of two mating and interlocking plates. FIG. 8 the two plates are the receiving plate FIG. 1 and FIG. 2, and lock plate FIG. 3 and FIG. 4. The lock plate FIG. 3 and FIG. 4 is a box like shape and is a size slightly larger than receiving plate FIG. 1 and FIG. 2. The receiving plate FIG. 1 and FIG. 2 will completely fit inside the lock plate FIG. 3 and FIG. 4. The lock plate FIG. 3 and FIG. 4 is dimensionally longer than the receiving plate FIG. 1 and FIG. 2 by roughly half the length of the receiving hole 32. The difference of size allows manual movement of one plate in relation to the other. Following is a detailed description of lock plate FIG. 3 and FIG. 4, receiving plate FIG. 1 and FIG. 2 and the interaction of the parts of the invention.

The lock plate FIG. 3 and FIG. 4 body is primarily formed sheet metal of a five-sided box shape. All corners that are not together are welded to result in a rigid, five-sided box with one side of the larger possible dimension being open. This results in one large solid side and four sides of a smaller dimension. The height of the four smaller sides is of a dimension slightly greater than that of plane 24 of receiving plate FIG. 1 and FIG. 2. On the solid side and inside of the box are at least two protruding metallic pins 38. Lock pins 38 may be welded or bolted using threaded insert to lock plate FIG. 3 and FIG. 4. The body of pins 36 are slightly smaller than the smallest dimension of receiving hole 32 of receiving plate FIG. 1 and FIG. 2. Pins 38 are mounted on lock plate FIG. 3 and FIG. 4 so the smaller dimension of pins 38 are attached to lock plate FIG. 3 and FIG. 4 and larger head pins 38 are protruding. Heads of lock pins 38 are slightly smaller than largest dimension of receiving hole 32 in receiving plate FIG. 1 and FIG. 2. On smaller end of lock plate FIG. 3 and FIG. 4 is a key actuated locking device 36. Holes are provided on largest dimension of lock plate FIG. 3 and FIG. 4 to accept fasteners.

Figure 1:
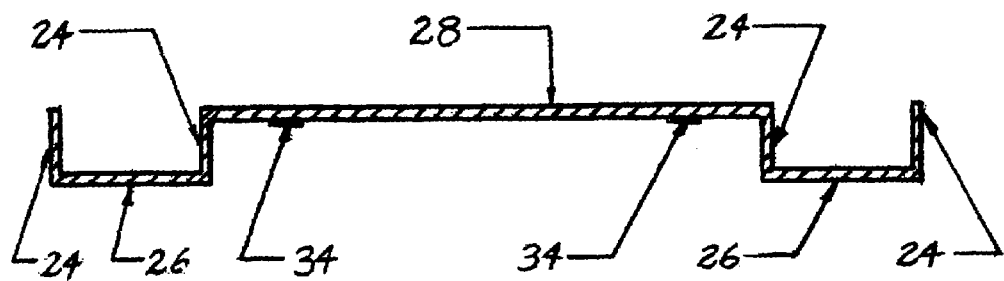
FIG. 1 is a top and bottom view of the receiving plate of a two receiving hole model.
Figure 2:
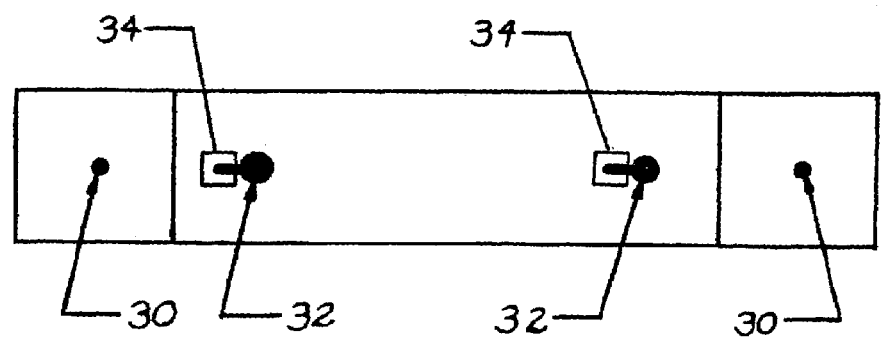
FIG. 2 is a front view of the receiving plate of a two receiving hole model.

The receiving plate FIG. 1 and FIG. 2 is primarily formed sheet metal and has seven sides. On receiving plate FIG. 1 and FIG. 2 there are four vertical sides of the same plane 24. The receiving plate body FIG. 1 and FIG. 2 consists of a formed contiguous sheet metal body of a shape, vertical plane 24, then lower horizontal plane 26, then vertical plane 24, then upper horizontal plane 28, then vertical plane 24, then lower horizontal plane 26, then vertical plane 24, with all vertical planes 24 in like position and parallel, and both lower horizontal plantes 26 being parallel and in like position. Receiving plate FIG. 1 and FIG. 2 is of a dimension that will completely fit into lock plate FIG. 3 and FIG. 4. On upper horizontal plane 28 are at least two receiving holes 32. Receiving holes 32 have a small hole joined with a larger hole and are positioned so that the largest dimension of hole is parallel to longest side of receiving plate FIG. 3 and FIG. 4. The immediate area surrounding at least a portion of receiving holes 32 have an additional thickness of metal in relation to thickness of receiving plate FIG. 1 and FIG. 2 body material. This reinforcing thickness of metal 34 may be welded to receiving plate FIG. 1 and FIG. 2 or attached by other means. The two lower horizontal planes 26 have holes 30 or slots 30 meant to accept-mechanical fasteners. On one outer vertical plane 24 is a lock hasp or pass-through hole for lock. Receiving holes 32 are arranged so that the large portion of receiving holes 32 align with lock pins 38 when mating lock plate FIG. 3 and FIG. 4 and receiving plate FIG. 1 and FIG. 2.

A description of mounting and locking action of the invention follows. Receiving plate FIG. 1 and FIG. 2 is securely attached to building, vehicle or substantial object by means of mechanical fastening or welding of upper horizontal plane 28. Lock plates FIG. 3 and FIG. 4 are either mechanically fastened or welded to tool storage container or portable item. The lock plate FIG. 3 and FIG. 4 body is placed over the receiving plate FIG. 1 and FIG. 2 body of the receiving plate FIG. 1 and FIG. 2 body so that lock pin 38 heads on lock plate FIG. 3 and FIG. 4 body pass through larger portion of receiving holes 32 on receiving plate FIG. 1 and FIG. 2 body. The lock plate FIG. 3 and FIG. 4 body is then manually shifted in relation to receiving plate FIG. 1 and FIG. 2 body causing lock pin heads 38 to move into a position that the lock pins 38 heads are a larger dimension than portion of receiving hole 32 in immediate area of lock pins 38. At this time a keyed lock device is enacted which makes it not possible to shift position of lock plate FIG. 3 and FIG. 4 in relation to position of receiving plate FIG. 1 and FIG. 2. After said actions occur it is not possible to easily remove lock plate FIG. 3 and FIG. 4 from receiving plate FIG. 1 and FIG. 2 and thus tool storage container or item attached to lock plate FIG. 3 and FIG. 4 is not portable and is now resistant to theft and movement in relation to receiving plate FIG. 1 and FIG. 2. Disengaging of key lock 36 and reversal of before-mentioned actions will allow separation of lock plate FIG. 3 and FIG. 4 from receiving plate FIG. 1 and FIG. 2 and causes item and lock plate FIG. 3 and FIG. 4 to once again become portable.

I claim:

1. An apparatus for supporting tool storage containers and portable items comprising a substantially box-shaped body having peripheral sides connected with a top side, at least one pin on the top side, the body shaped to conceal the periphery of a separate body having a plurality of sides which include a vertical plane, then a lower horizontal plane, then a vertical plane, then an upper horizontal plane, then a vertical plane, then a lower horizontal plane, then a vertical plane, with the lower horizontal planes being parallel to one another, at least one hole in the upper horizontal plane side to receive the at least one pin, and a locking device located on a peripheral side of the substantially box-shaped body to prevent removal of the bodies from one another.

2. The apparatus as claimed in claim 1 wherein the at least one hole being reinforced with an additional thickness of attached metal.

\* \* \* \* \*